(12) United States Patent
Sunder et al.

(10) Patent No.: US 8,961,671 B2
(45) Date of Patent: Feb. 24, 2015

(54) SUPER HYDROPHOBIC AND ANTISTATIC COMPOSITION

(71) Applicant: Illinois Tool Works, Inc., Glenview, IL (US)

(72) Inventors: J. Mohan Sunder, Tamil Nadu (IN); Sameer Arvind Kapole, Maharashtra (IN); Subodh Deshpande, Andhra Pradesh (IN)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 13/843,264

(22) Filed: Mar. 15, 2013

(65) Prior Publication Data
US 2014/0212592 A1   Jul. 31, 2014

(30) Foreign Application Priority Data

Jan. 30, 2013   (IN) .............................. 413/CHE/2013

(51) Int. Cl.
| | | |
|---|---|---|
| *C09K 3/18* | (2006.01) | |
| *C09K 3/16* | (2006.01) | |
| *B05D 5/00* | (2006.01) | |
| *B05D 5/08* | (2006.01) | |
| *B01J 2/30* | (2006.01) | |
| *C09D 1/00* | (2006.01) | |
| *B08B 17/06* | (2006.01) | |
| *C09D 5/16* | (2006.01) | |
| *C09D 183/04* | (2006.01) | |

(52) U.S. Cl.
CPC .. *C09D 1/00* (2013.01); *B05D 5/00* (2013.01); *B08B 17/065* (2013.01); *C09D 5/1618* (2013.01); *C09D 183/04* (2013.01)
USPC ........................... 106/2; 427/421.1; 427/427.4

(58) Field of Classification Search
CPC .............. C09K 3/00; C09K 3/16; C09K 3/18; B05D 1/02; B05D 5/00; B01J 2/30
USPC ................................. 106/2; 427/421.1, 427.4
See application file for complete search history.

(56) References Cited

U.S. PATENT DOCUMENTS

| | | | | |
|---|---|---|---|---|
| 7,153,357 | B2 * | 12/2006 | Baumgart et al. | 106/481 |
| 7,531,598 | B2 * | 5/2009 | Muller et al. | 524/588 |
| 2006/0110542 | A1 | 5/2006 | Dietz et al. | |
| 2006/0286305 | A1 * | 12/2006 | Thies et al. | 427/508 |
| 2007/0232729 | A1 | 10/2007 | Briehn et al. | |
| 2009/0136741 | A1 | 5/2009 | Zhang et al. | |
| 2010/0063187 | A1 | 3/2010 | Briehn et al. | |
| 2010/0316810 | A1 * | 12/2010 | Brown | 427/508 |
| 2011/0177252 | A1 * | 7/2011 | Kanagasabapathy et al. | 427/397.7 |

FOREIGN PATENT DOCUMENTS

| | | |
|---|---|---|
| EP | 0987317 | 3/2000 |
| EP | 1997853 | 3/2008 |
| WO | 2007102960 | 9/2007 |

* cited by examiner

*Primary Examiner* — Anthony J Green
(74) *Attorney, Agent, or Firm* — Blue Filament Law PLLC; Avery N. Goldstein

(57) ABSTRACT

A super hydrophobic and antistatic brake dust repellent composition using solvents, adhesion promoter, and hydrophobic inorganic nano particles as a main ingredient is provided. Embodiments of the inventive formulation provide a composition/coating, and a process for protecting various surfaces from the appearance of soil, brake dust, grime, muddy water marks, and corrosion. The applied formulation forms an essentially transparent, detachable, and anti-graffiti protective coating on a receptive surface. Embodiments of the coating film are clearly transparent, and retain the aesthetic appeal of the underneath painted film. The composition/coating acts as a self-cleaning coating so it reduces a adsorption of dirt, other contaminants, muddy water, etc. The coating can be applied at room temperature, and within 120 minutes super hydrophobicity can be achieved. The composition may be applied by spray on any type of surface of a wheel including plastic and metal alloy wheels, painted parts, ceramic, and mild steel substrate.

14 Claims, 3 Drawing Sheets

SUPER HYDROPHOBIC AND ANTISTATIC COMPOSITION

CROSS-REFERENCE TO RELATED APPLICATIONS

This application is a non-provisional application that claims priority benefit of Indian Provisional Application Serial No. 413/CHE/2013, filed Jan. 30, 2013 the contents of which are hereby incorporated by reference.

FIELD OF THE INVENTION

The present invention relates to a nanotechnology based super hydrophobic and antistatic composition on surfaces to produce a coating film that in some instances has 99% or more transparency that repels soil, brake dust, grime, muddy water etc. More particularly, this invention relates to super hydrophobic and antistatic composition, which is suitable for uncoated or coated plastic and aluminum alloy surfaces, for all kinds of automobile wheels. The present invention also relates to a process of preparing the super hydrophobic and antistatic composition, and a method of application of the coating composition to surfaces.

BACKGROUND OF THE INVENTION

Aesthetics of any vehicle is a one of the prime requirements and concerns for any automobile user ranging from the tires to the hood of that vehicle, and other parts as well. For example, the shine and glossy facade of the wheels enhances the overall splendor of an automobile. However, the luster of the wheels shine is dulled by various factors including brake dust, road grime, muddy water, etc. Out of those, brake dust not only deteriorates the glossiness, but also the dusts long term contact augments the corrosion tendencies of the wheel.

Generally, brake dust is a product of wear from the friction between the brake pads and rotors of the vehicle. Brake pads convert the kinetic energy of the car to thermal energy by friction. Two brake pads are contained in the brake caliper with their friction surfaces facing the rotor. When the brakes are hydraulically applied, the caliper clamps or squeezes the two pads together into the spinning rotor to slow/stop the vehicle. When a brake pad is heated by contact with a rotor, it transfers small amounts of friction material to the disc, turning it a dull gray. The brake pad and disc (both now with friction material), then "stick" to each other, providing the friction that stops the vehicle. In order to maintain the original appearance of automobiles, a wide variety of automobile appearance products are used in consumer applications. Specifically, numerous wheel and tire cleaners are commercially available to maintain the appearance of soiled tires, metal or plastic wheels, wheel covers, or hubcaps. These wheel cleaners are typically acidic formulations, with pH ranges from 2 to 4. The extreme acidity of the wheel cleaner is required to effectively remove brake dust, road soil, and grime. These formulations also typically use anionic, amphoteric, or non-ionic surfactants to enhance the detergency of the wheel cleaning formulation. The extremely low pH of these formulations makes their compatibility poor with many metallic wheels, and most of these products are devised for use on clear-coated wheels so there is no (or very low) chance of acid corrosion. The compositions must be washed or wiped from the tires and wheels within 15 seconds to one minute to prevent permanent damage to the wheels, and also to facilitate cleaning.

The principle of self-cleaning plays a major role in brake dust repellent coatings. In order to achieve a good self-cleaning and dirt repellent surface, the surface not only has to be very hydrophobic, but also has to have some degree of roughness. A suitable combination of structure and hydrophobic properties does not permit any kind of dust or contaminants, including water, to adhere on the surface.

A number of attempts have been made, as evidenced in the prior art, to obtain a super hydrophobic and antistatic composition. U.S. Pat. No. 7,083,828 to Muller et al. describes a formulation for detachable dirt and water repellent coating which has to be applied at room temperature only. U.S. Patent publication number US 2007/0190308 to Brand et al. discloses the formulation for scratch resistant and self-cleaning protective layer for rims of automobiles, but has the drawback that the formulation requires two layers to achieve the effect, and has to cure at an elevated temperature (up to 200° C.). U.S. patent publication number 2009/0018249 to Kanagasabapathy et al. discloses a coating composition for a hydrophobic self-cleaning effect but has the drawback that the formulation has to be applied on wax surface only. U.S. patent publication number 2004/0213904 to Muller et al. discloses a process for producing a water repellent and dirt detachable surface coating consisting of hydrophobic particles in conjunction with alkyd modified silicone wax in a highly volatile siloxane. The suspension is applied to the surface of an article, and volatile siloxane is evaporated forming a grayish coating. The disadvantage of this coating is hazy layer that is left on the treated surface, and is not suited for cosmetic applications.

Furthermore, there are several published articles which have dealt with elimination of water marks. U.S. Pat. No. 5,759,980 to Russo et al. discloses a coating comprised of silicone based surfactant and a polymer, where the Polymer is used as a binder. However, this coating is hydrophilic in nature and may tend to be removed from the surface by single wipe.

The patent publication number WO 2008/153687 discloses a super hydrophobic coating composition composed of nano silica and an acetone solvent combination for forming a clear coating film for painted surfaces on metal, glass, ceramic, fiberglass, wood, and waxed substrates. A Treated silica particle layer forms a contact angle of 165 degrees and a rolling angle of 2 degrees. Despite various advantages of the composition, it has the disadvantage that its durability against vibration and bond strength with the surface of the substrate, and is not suited for automotive applications.

Thus, there is a need for a cost effective super hydrophobic and antistatic composition that can be successfully used for all kinds of automobile wheels, overcoming the above mentioned problems of the currently available super hydrophobic coating compositions, which reduces the accumulation of dust, soil and grime on vehicle wheels without the use of harsh chemicals.

SUMMARY OF THE INVENTION

Embodiments of the present invention provide a super hydrophobic and antistatic brake dust repellent composition using solvents, adhesion promoter and hydrophobic inorganic nano particles as a main ingredient. Embodiments of the inventive process and product recipe are based on lotus leaf effect principle.

Embodiments of the invention provide a composition/coating, and a process for protecting various surfaces from the appearance of soil, brake dust, grime, muddy water marks, and corrosion. Embodiments of the present invention form an essentially transparent, detachable, and anti-graffiti protective coating on a receptive surface. Embodiments of the coating film are clearly transparent, and retain the aesthetic appeal of the underneath painted film, which overcome the problems associated with the prior art.

Embodiments of the invention possess several advantages including the following: The composition/coating not only acts as a brake dust repellent coating, but also acts as a self-cleaning coating so it reduces a adsorption of dirt, other contaminants, muddy water, etc. The composition is clear coating so that after the application over a painted alloy wheel or wheel cap, the visible surface retains the aesthetic appeal of the underneath painted film. The coating can be applied at room temperature, and within 120 minutes super hydrophobicity can be achieved. When water droplets or muddy water come in contact with the applied composition, no water marks or spots remain behind on the treated surface, which can be found on non-coated surfaces due to deposits of minerals, therefore reducing the effort needed for cleaning the surface. Embodiments of the composition are easy to apply by spray on any type of surface of a wheel including plastic and metal alloy wheels, painted parts, ceramic, mild steel substrate, etc.

BRIEF DESCRIPTION OF THE DRAWINGS

The foregoing summary, as well as the following detailed description of the invention will be better understood when read in conjunction with the appended drawings. For the purpose of assisting in the explanation of the invention, there are shown in the drawings embodiments which are presently preferred and considered illustrative. It should be understood, however, that the invention is not limited to the precise arrangements and instrumentalities shown therein. In the drawings.

DESCRIPTION OF THE INVENTION

Figure 1:
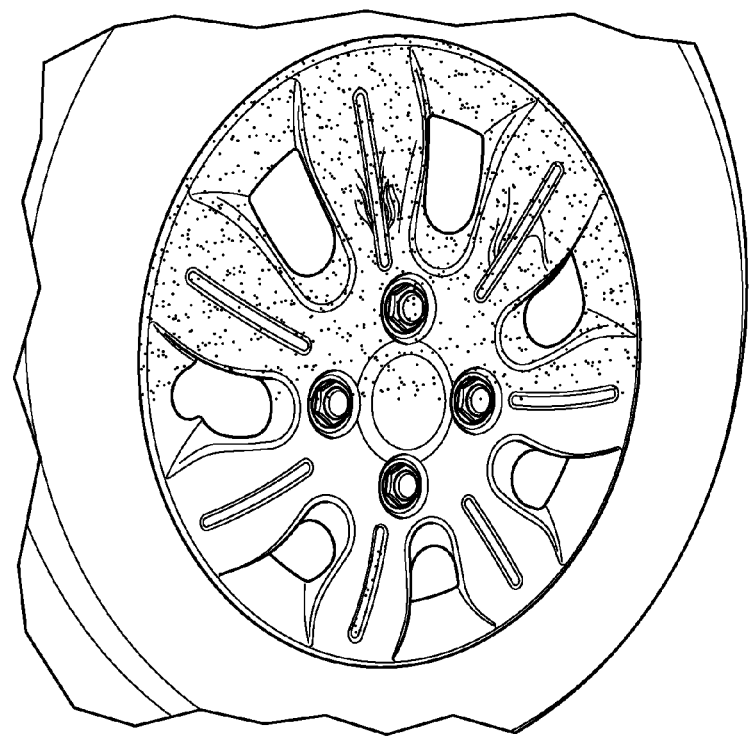
FIG. 1 is a photographic view of a field trial test of the inventive formulation applied to a plastic wheel cap.

In describing and claiming the invention, the following terminology will be used in accordance with the definitions set forth below. Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described herein. As used herein, each of the following terms has the meaning associated with it in this section. Specific and preferred values listed below for individual process parameters, substituents, and ranges are for illustration only; they do not exclude other defined values or other values falling within the preferred defined ranges.

As used herein, the singular forms "a," "an," and "the" include plural reference unless the context clearly dictates otherwise. When the term "about" is used in describing a value or an endpoint of a range, the disclosure should be understood to include both the specific value and end-point referred to.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

Thus, before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

DEFINITIONS

As used herein, the term "contact angle" or "static contact angle" is referred to as the angle between a static drop of deionized water and a flat and horizontal surface upon which the droplet is placed. As is well known in the art the contact angle is used as a measure of the wetting behavior of a surface. If a liquid spreads completely on the surface and forms a film, the contact angle is zero degrees (0°). As the contact angle increases, the wetting resistance increases, up to a theoretical maximum of 180°, where the liquid forms spherical drops on the surface. The term "wet-proof" is used to describe surfaces having a high wetting resistance to a particular reference liquid; "hydrophobic" is a term used to describe a wetting resistant surface where the reference liquid is water. The higher the contact angle, the higher the hydrophobic interaction between the surface and the liquid.

As used herein, the term "wetproof" and "hydrophobic" refers to a surface that generates a contact angle of greater than 90° with a reference liquid. As the wetting behavior depends in part upon the surface tension of the reference liquid, a given surface may have a different wetting resistance (and hence form a different contact angle) for different liquids.

As used herein, the term "substrate" is not construed to be limited to any shape or size, as it may be a layer of material, multiple layers or a block having at least one surface of which the wetting resistance is to be modified.

As used herein the term "hydrophobic" is characterized by the contact angle for water of greater than 90°, which means that the water droplet does not wet the surface.

As used herein, "super-hydrophobicity" refers to a contact angle for deionized water at room temperature equal to or greater than 150° and "self-cleaning" refers to a sliding angle less than 5°.

As used herein the term "lotus effect" is a naturally occurring effect first observed on lotus leaves and is characterized by having a randomly rough surface and low contact angle hysteresis, which means that the water droplet is not able to wet the microstructure spaces between the spikes. This allows air to remain inside the texture, causing a heterogeneous surface composed of both air and solid. As a result, the adhesive force between the water and the solid surface is extremely low, allowing the water to roll off easily and to provide the "self-cleaning" phenomena.

The lotus plant exhibits self-cleaning properties because the surfaces of the leaves are covered with small nano sized projections, bumps or ridges. Surfaces exhibiting super hydrophobic characteristics due to nano sized irregularities thereof are often referred to as exhibiting the "Lotus Effect". Super hydrophobic coatings utilizing nano sized irregularities applied to a surface form a high contact angle which resist wetting and adherence of dirt and contaminants.

The Lotus Effect is a well-known technology capable of producing super hydrophobic surfaces. Interestingly, those surfaces are comprised of nanoparticles that are not inherently hydrophobic. The hydrophobic properties are the result of the nanoscale. Importantly, the nanoparticles make possible the production of a super-hydrophobic surface. Equally important, the nanoparticles provide a nano-textured surface that dramatically reduces the surface area available for dust to contact.

As used herein, the term "coating" means a deposit layer applied to part or all of an exposed surface of a substrate.

As used herein, the term "Adsorption principle" is based on the fact that coating film gets cured due to evaporation of solvent, and nanoparticles gets adsorbed firmly on the surface of the substrate to perform as per the desired set properties of generating higher contact angle and water repellency.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the present invention provide a super hydrophobic and antistatic brake dust repellent composition using solvents, adhesion promoter, and hydrophobic inorganic nano particles as a main ingredient. The inventive nanotechnology based super hydrophobic and antistatic composition when applied on surfaces produce a coating film that repels soil, brake dust grime and muddy water etc. Embodiments of the inventive process and product recipes are based on lotus leaf effect principle.

Embodiments of the invention provide a composition/coating, and a process for protecting various surfaces from the appearance of soil, brake dust, grime, muddy water marks, and corrosion. Embodiments of the present invention form an essentially transparent, detachable, and anti-graffiti protective coating on a receptive surface. Embodiments of the coating film are clearly transparent, and retain the aesthetic appeal of the underneath painted film, which overcome the problems associated with the prior art.

Embodiments of the invention possess several advantages including the following: The composition/coating not only acts as a brake dust repellent coating, but also acts as a self-cleaning coating so it reduces a adsorption of dirt, other contaminants, muddy water, etc. The composition is clear coating so that after the application over a painted alloy wheel or wheel cap, the visible surface retains the aesthetic appeal of the underneath painted film. The coating can be applied at room temperature, and within 120 minutes super hydrophobicity can be achieved. When water droplets or muddy water come in contact with the applied composition, no water marks or spots remain behind on the treated surface, which can be found on non-coated surfaces due to deposits of minerals, therefore reducing the effort needed for cleaning the surface. Embodiments of the composition are easy to apply by spray on any type of surface of a wheel including plastic and metal alloy wheels, painted parts, ceramic, mild steel substrate, etc.

In embodiments of the present invention, formation of low surface energy film on a wheels surface by uniformly distributed nano silica particles with proper binding mechanism enhances the super hydrophobicity that delivers a film that repels soil, brake dust, and grime, etc. The inventive composition produces a film which in some instances is 99% transparent in nature and adheres on a surface of the substrate by adsorption principle.

In one aspect the present invention pertains to a composition/coating comprising solvent, adhesion promoter and hydrophobic inorganic nano particles as a main ingredient. According to this aspect the following components numbered 1 and 2 could be considered as essential components, and point number 3 could be an optional component of the composition:
1. Hydrophobic inorganic nano silica particles: These are surface treated nano particles by using polydimethylsiloxy group.
2. Adhesion Promoter: These are non-reactive organo silane family group like methyl (alkyl) silane, isobutyl silane, n-octyl silane etc.
3. Solvent In embodiments the nanoparticles used in embodiments may be of a wide variety of compounds from many branches of chemistry or from the natural world. The nanoparticles preferably have at least one material selected from silicates, doped silicates, minerals, metal oxides, silicas, polymers, and coated metal powders. The particles may themselves be hydrophobic (e.g., particles comprising PTFE), or the particles used may have been hydrophobized. The particles may be hydrophobized in a manner known to the skilled worker. Preferably, the nanoparticles possess hydrophobic properties as a result of treatment with at least one compound selected from the group consisting of the alkyl silanes, fluoroalkylsilanes, perfluoroalkylsilanes, paraffins, waxes, fatty esters, functionalized long-chain alkane derivatives, disilazanes, and alkyl disilazanes. Particularly suitable nanoparticles are silica, clay, titania, ZnO, etc.

The particles size of nano particles ranges preferably from 10 to 500 nm, more preferably 10 to 300 nm, and the most preferably 10 to 100 nm in the present composition.

Embodiments of the composition include an effective amount of nano silica particles of 0.01 to 5% by weight to the total formulation and its size ranges preferably from 10 to 500 nm, more preferably 10 to 300 nm and the most preferably 10 to 100 nm in a solvent/diluents resulting in a coated surface providing a contact angle of 158° as compared to non-coated aluminum surface when water has a contact angle between 80 to 90°. The composition imparts a sliding angle of 2 to 3° as compared to water on a non-coated surface.

Silanes are defined as saturated hydrosilicons, are chemical compounds that consist only of hydrogen and silicon atoms, and are bonded exclusively by single bonds (i.e., they are saturated compounds) without any cycles (or loops; i.e., cyclic structure). Silanes belong to a homologous series of inorganic compounds, analogous to alkanes, in which the members differ by a constant relative molecular mass of 30. Each silicon atom has 4 bonds (either Si—H or Si—Si bonds), and each hydrogen atom is joined to a silicon atom (H—Si bonds). A series of linked silicon atoms is known as the silicon skeleton or silicon backbone. The number of silicon atoms is used to define the size of the silane (e.g., $Si_2$-silane). Various silane groups have been used as an adhesion promoter for surfaces like uncoated or coated plastic and aluminum alloy surfaces, etc. for all kind of automobile wheels. Preferably, silanes can be ranging from non-reactive organo silane family group like Methyl(alkyl)silane, Isobutyl silane, n-octyl silane, etc.

In an embodiments, an adhesion promoter acts as coupling agent for hydrophobic treated nano silica particles with the substrate. This silane modifies the surface energy/wettability of the substrate under normal conditions, but does not impart chemical reactivity to the substrate. The adhesion promoter also acts as an effective dispersing agent for hydrophobic treated nano silica particles. Hydrophobic silica nano particles are surface treated nano particles by using the polydimethylsiloxy group. The particle size of nano particles ranges preferably from 10 to 500 nm, more preferably 10 to 300 nm, and the most preferably 10 to 100 nm in the present composition. The nano particles have the silane group on their surface, which enhances the wet resistance and reduces the agglomeration tendency in the solvent, so that applied film has an even distribution of the nano particles which helps to achieve the super hydrophobicity. The coating composition as per this embodiment has the following formulation percentages: solvent 80 to 99%, adhesion promoter 0.1 to 10%, and hydrophobic particles 0.01 to 5%. The following may be considered as the optional components of the composition: a diluent solvent may be selected from the group consisting of silicone oil as its main component ranging from 2 centi stokes to 10 centi stokes, and preferably acyclic and or cyclic dimethylsilicone oil. According to an embodiment of the invention, silicone oil may be added as a solvent and a carrier for adhesion promoter with hydrophobic nano particles in the formulation without disturbing the properties of the other raw materials.

A process for preparing the superhydrophobic and antistatic composition includes the steps of: adding the solvent to the kettle free from any contaminations and stirring at 500 rpm for 2 min; adding a desired quantity of adhesion promoter to the same kettle and continue to stir for 15 min; adding a desired quantity of nano particle to the same kettle and continue to stir for 30 min with high shearing rate; and proceeding for product packing.

Another aspect of embodiments of the invention relates to a methods of application of embodiments of the composition to surfaces. In an embodiment, the composition is sprayed on a clean and dried surface, and then allowing the composition to dry. In an embodiment the drying time is 2 hours, however the drying time will vary depending on the temperature. The coating composition of the present invention is generally applied to a substrate surface by various methods such as by pouring, brushing and spraying. In an embodiment, coating composition of the present invention is preferably applied to substrate surface by spraying. On a surface treated aluminum and ABS plastic substrate, the coating application is done by using aerosol spray method. For automotive alloy wheel and wheel cover surfaces, the application of this thin film substantially eliminates or reduces the need for harsh acidic, caustic, or solvent borne cleaners to maintain wheel and wheel cap appearance.

The present invention is further illustrated with respect to the following non-limiting examples that are intended to illustrate specific embodiments. These examples should not be construed as limiting the scope of the appended claims.

EXAMPLES

On a surface treated aluminum and acrylonitrile butadiene styrene (ABS) plastic substrate, the coating application was done by using the aerosol spray method. Evaluation of field trials and lab scale for samples of present formulation and market sample were conducted. After having 2000 miles extensive travelling the results found superior performance for the inventive composition as compared to a market sample for brake dust repellency, dust accumulation, and retaining tendency of stains of muddy water on alloy wheel and ABS plastic wheel caps.

Example 1

Evaluation of coating properties of brake dust repellent formulation based on pertinent test data and lab reports are shown in table 1.

TABLE 1

| Sl No | Properties | Test Method | Market sample (ArmorAll) | Present Formulation |
|---|---|---|---|---|
| 1 | Contact Angle | ASTM D7334 | 152° | 158° |
| 2 | Sliding Angle | — | 4° | 3° |
| 3 | Contact Angle: 30 Min under running tap water | ASTM D7334 | 130° | 142° |
| 4 | Coating Transparency as per UV Spectrometer | — | 99% | 99% |
| 5 | Antistatic Property (Surface Resistivity), Ohms | ASTM D256 | $5 \times 10_{13}$ | $5 \times 10_{13}$ |

Table 1 shows the results of evaluated properties of present inventive formulation and a market sample (Armor All® Wheel protectant produced by Armored Autogroup).

Although transparency and antistatic properties of the inventive formulation and market sample are equivalent, the sliding angle and contact angle of the invented formulation was found to be better than the market sample.

In a further evaluation of the coating, it was found that for 30 min under a running tap water test the present formulation behaved better than market sample in terms of contact angle.

The results of above mentioned table 1 shows that the contact angle of a market sample is 152°, where as the presently invented formulation is 158°, which indicated that the water droplet has more wet resistance on invented sample than the market sample.

Example 2

A test to evaluate brake dust accumulation rate on coated panels was conducted with the following procedure:
1. Take the initial weight of the Aluminum alloy panel
2. Spray the synthetic brake dust across the panel
3. Without shaking, tilt the panel for 90°
4. Take the final weight of the panel
5. Calculate the Percentage of dust retention.

The results of the evaluation are shown in table 2.

TABLE 2

| Sl No. | | Initial Weight, g | Final Weight, g | Percentage retention |
|---|---|---|---|---|
| | | Aluminum Alloy Panel | | |
| 1 | Invented present Formulation | 81.3 | 81.38 | 0.10 |
| 2 | Market sample | 81.6 | 81.82 | 0.27 |
| | | ABS Plastic Panel | | |
| 1 | Invented present Formulation | 20.4 | 20.44 | 0.20 |
| 2 | Market sample | 20.5 | 20.6 | 0.49 |

Table 2 describes the brake dust repellency effect of presently invented formulation and a market sample. The repellency performance of the formulation was evaluated with an actual application on alloy wheels and wheel caps.

The results shown in table 2 indicates that the percentage of dust retention of the market sample is higher than with the presently invented formulation. It is clear from the above table that the presently invented composition is superior than the market sample in terms of dust repellency performance.

FIG. 1 is a photographic view of a field trial test of the inventive formulation applied to a plastic wheel cap, showing the contrast between coated and uncoated areas.

Figure 2:
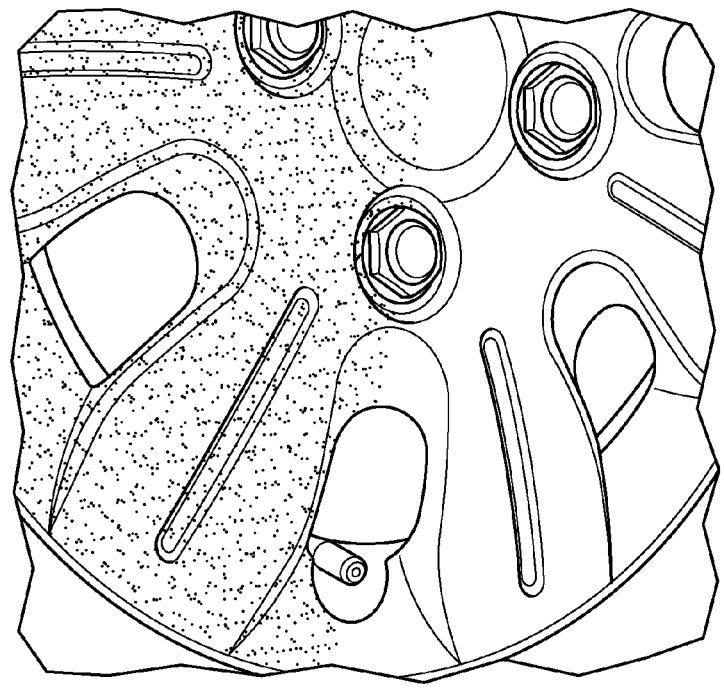
FIG. 2 is a photographic view of a field trial test for a market sample product applied to a wheel cap.

FIG. 2 is a photographic view of a field trial test for a market sample product applied to a wheel cap, showing the contrast between coated and uncoated areas.

Figure 3:
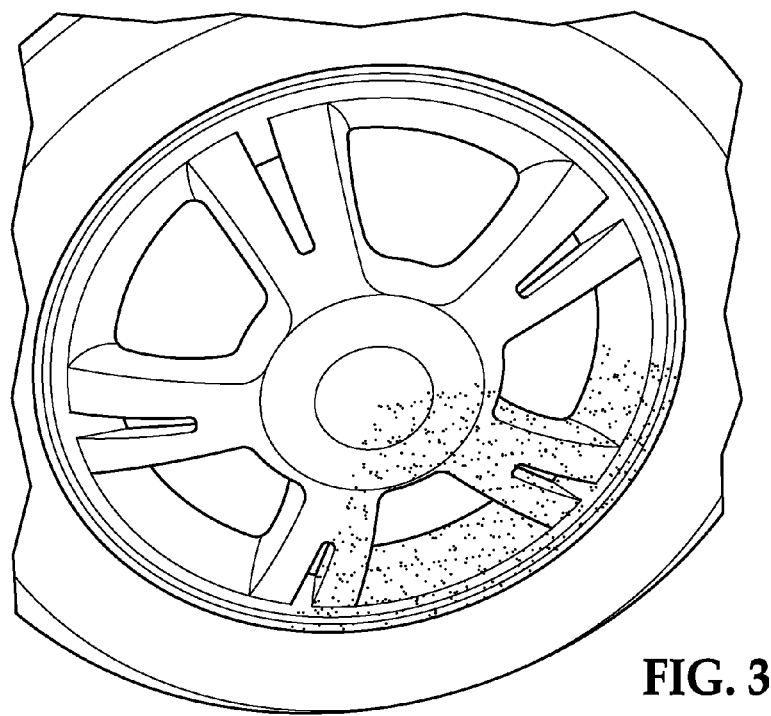
FIG. 3 is a photographic view of field trial test conducted for the present formulation applied on an alloy wheel after a 1600 miles of wheel use.

FIG. 3 is a photographic view of field trial test conducted for the present formulation applied on an alloy wheel after a 1600 miles of wheel use, showing the contrast between coated and uncoated areas.

Figure 4:
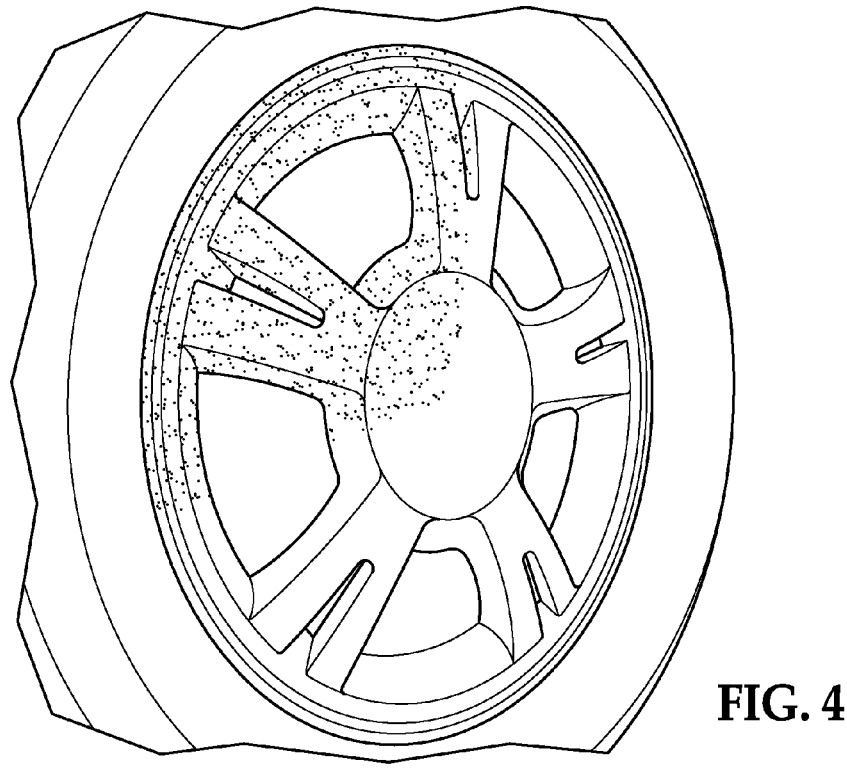
FIG. 4 is a photographic view of field trial test conducted for a market sample applied on an alloy wheel after a 1600 miles of wheel use.

FIG. 4 is a photographic view of field trial test conducted for a market sample applied on an alloy wheel after a 1600 miles of wheel use, showing the contrast between coated and uncoated areas.

Figure 5:
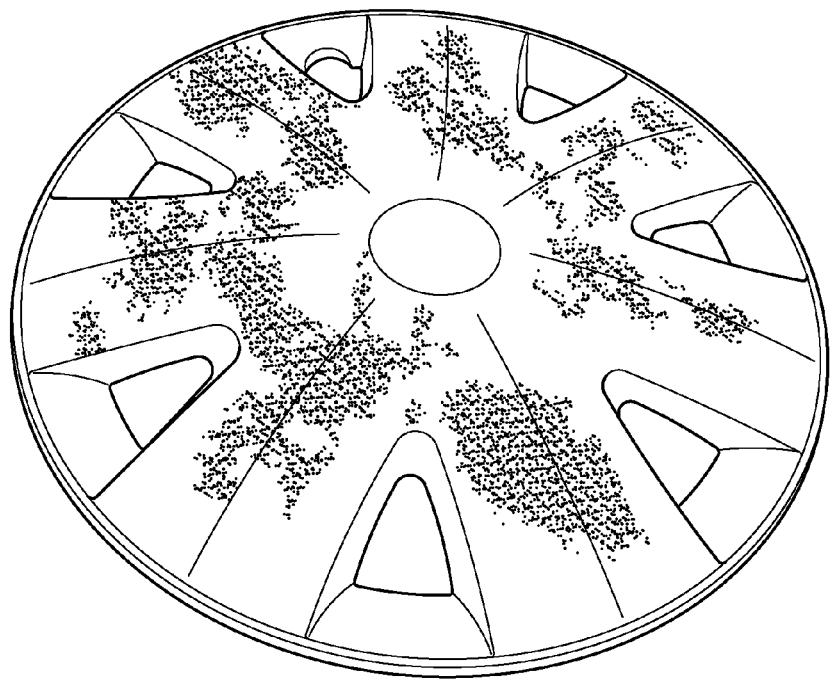
FIG. 5 is a photographic view of a test using synthetic brake dust on a wheel surface partially coated with an embodiment of the inventive coating and with a market sample.

FIG. 5 is a photographic view of a test using synthetic brake dust on a wheel surface partially coated with an embodiment of the inventive coating and with a market sample, showing the contrast between coated and uncoated areas.

CONCLUSIONS

Field Trial Evaluation:

After the surface preparation, the invented composition was applied on wheel cap and alloy wheel surfaces by aerosol spray method. Field trials and experimental data showed that the presently invented compositions are superior to market samples in terms of brake dust repellency, dust accumulation, and where stains of muddy water is of concern.

Since embodiments of the inventive coating have super hydrophobicity characteristics, the coating formulation was evaluated for the honey effect on coated Aluminum alloy panels.

Figure 6:
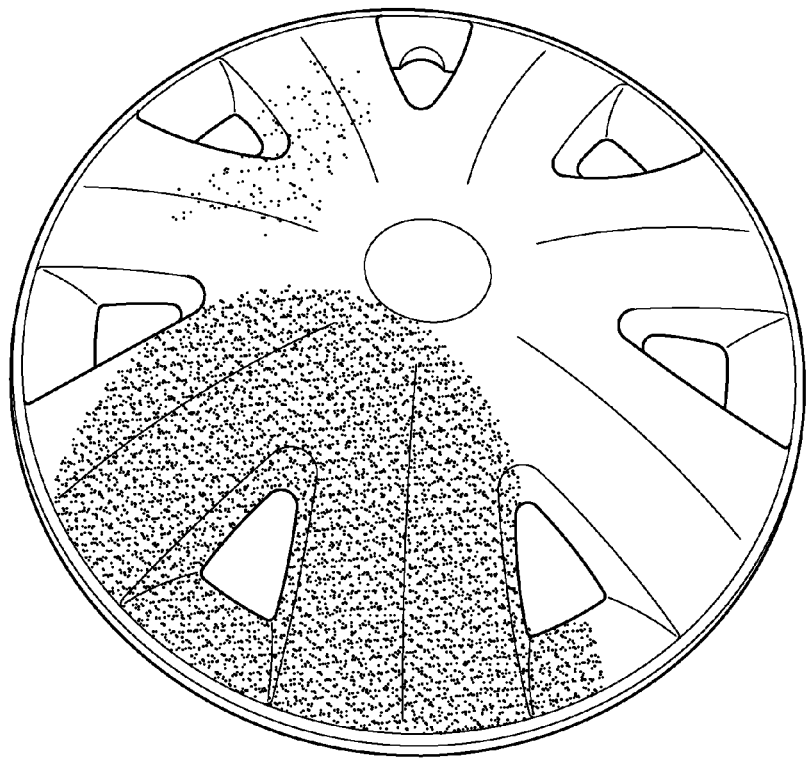
FIG. 6 is a photographic view of the Honey Effect on a coated aluminum alloy panel for the present inventive formulation as well as for a market sample.

Honey Effect on Coated Aluminum Alloy Panel:

It was observed that the bead formation took place immediately when the honey poured on the films of invented formulation, as well as on market sample, and while tilting the panel by 30° the honey beads rolled off completely without any traces. It was also noted that the rolled off speed of honey beads from the surface coated with the inventive formulation was faster than the market sample as shown in FIG. 6.

Among the advantages exhibited by embodiments of the inventive formulations versus market samples include:

An adhesion factor due to the adsorptions method which retains its durability factor more than the market sample in field trials.

With the inventive coating, a sticky material like honey forms a high contact angle and low slide angle faster than on the market sample.

Due to the blend of silane silanol chemicals in the composition, the adhesion of the film to the surface of a substrate, and nano-particles holding capacity of the film, enhances the coating durability under tap water compared to the market sample.

The product recipe acts as brake dust repellent and anti-static in all aspects.

The inventive coating may be applied to plastics, metal and other surfaces to provide the dust repellency character to avoid dust accumulation.

Any patents or publications mentioned in this specification are herein incorporated by reference to the same extent as if each individual publication was specifically and individually indicated to be incorporated by reference.

The foregoing description is illustrative of particular embodiments of the invention, but is not meant to be a limitation upon the practice thereof. The following claims, including all equivalents thereof, are intended to define the scope of the invention.

The invention claimed is:

1. A superhydrophobic and antistatic composition comprising:
   hydrophobic nanoparticles, the nanoparticles selected from the group consisting of: silicates, doped silicates, minerals, metal oxides, silicas, polymers and coated metal powders; and
   an adhesion promoter selected from the group consisting of: methyl(alkyl)silane, isobutyl silane, or a n-octyl silane, the composition when applied to a surface as a coating having a contact angle for deionized water at room temperature equal to or greater than 150° and a sliding angle less than 5.

2. The composition of claim 1 further comprising a solvent.

3. The composition of claim 2 wherein the amount of solvent is from 80 to 99%.

4. The composition of claim 2 wherein the solvent is a silicone oil.

5. The composition of claim 1 wherein the nanoparticles are the silicas further comprising a polydimethyl siloxy coating thereon.

6. The composition of claim 1 wherein the nano particles have particle size from 10 nm to 500 nm.

7. The composition of claim 1 wherein the nano particles have particle size from 10 nm to 300 nm.

8. The composition of claim 1 wherein the nano particles have particle size from 10 nm to 1000 nm.

9. The composition of claim 1 wherein the amount of adhesion promoter is present from 0.1 to 10%.

10. The composition of claim 1 wherein the amount of hydrophobic nano particles is present from 0.01 to 5%.

11. The composition of claim 1 wherein the composition is 99% transparent upon application to a surface.

12. A method of application of the superhydrophobic and antistatic composition of claim 1, the method comprising:
    spraying the composition to a surface by spraying to form a coating having a contact angle of at least 158 degrees.

13. A method of application of the superhydrophobic and antistatic composition of claim 1, the method comprising:
    spraying the composition to a surface by spraying to form a coating that is 99% transparent.

14. A process for preparing a superhydrophobic and anti-static composition superhydrophobic and antistatic composition comprising:
    hydrophobic nanoparticles; solvent; and an adhesion promoter, the process comprising:
    a) adding the solvent to a kettle free from any contaminations and stirring at 500 rpm for 2 min;
    b) adding a quantity of the adhesion promoter to the same kettle and continue to stir for 15 min;
    c) adding a quantity of the nanoparticles to the kettle and continue to stir for 30 min; and
    d) packing of the composition.

* * * * *